(12) United States Patent
Ide et al.

(10) Patent No.: US 6,967,287 B2
(45) Date of Patent: Nov. 22, 2005

(54) WATER CUTOFF STRUCTURE OF COVERED WIRE

(75) Inventors: Tetsuro Ide, Shizuoka (JP); Tsutomu Takayama, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/687,934

(22) Filed: Oct. 20, 2003

(65) Prior Publication Data

US 2004/0163729 A1 Aug. 26, 2004

(30) Foreign Application Priority Data

| Oct. 18, 2002 | (JP) | ............ P2002-304343 |
| Oct. 18, 2002 | (JP) | ............ P2002-304344 |
| Oct. 21, 2002 | (JP) | ............ P2002-306102 |

(51) Int. Cl.[7] .............................................. H01R 4/00
(52) U.S. Cl. ..................................... 174/84 R; 29/872
(58) Field of Search ................................ 174/74 R, 84 R, 174/94 R, 92; 156/580.2; 428/60; 439/460

(56) References Cited

U.S. PATENT DOCUMENTS

| 5,869,784 A | * | 2/1999 | Shinchi ................... 174/84 R |
| 5,925,202 A | * | 7/1999 | Ide et al. .................. 156/73.2 |
| 5,929,384 A | * | 7/1999 | Ide et al. .................. 174/84 R |
| 5,959,252 A | * | 9/1999 | Ide et al. .................. 174/84 R |
| 5,997,340 A | * | 12/1999 | Ito et al. .................... 439/460 |
| 6,004,170 A | * | 12/1999 | Kato et al. ................. 439/874 |
| 6,027,009 A | * | 2/2000 | Shinchi ................... 228/111.5 |
| 6,027,589 A | * | 2/2000 | Kato et al. ................ 156/73.2 |
| 6,313,407 B1 | * | 11/2001 | Shinchi et al. ............ 174/84 R |

FOREIGN PATENT DOCUMENTS

| JP | 7-320842 A | 12/1995 |
| JP | 11-250952 A | 9/1999 |

* cited by examiner

*Primary Examiner*—William H. Mayo, III
(74) *Attorney, Agent, or Firm*—Sughrue Mion, PLLC (57) ABSTRACT

In a water cutoff structure of a covered wire, a water cutoff portion of an upper side member of a water cutoff member is formed in a recessed shape which is a shape of a curved face along an outer shape of the covered wire. Further, a water cutoff portion of a lower side member is formed in a projected shape in correspondence with the water cutoff portion in the recessed shape and the projected shape is a shape of a curved face in a projected shape in correspondence with the shape of the curved face of the water cutoff portion in the recessed shape.

10 Claims, 11 Drawing Sheets

WATER CUTOFF STRUCTURE OF COVERED WIRE

The present application is based on Japanese Patent Applications Nos. 2002-304343, 2002-304344 and 2002-306102, the entire contents of which are incorporated herein by reference.

BACKGROUND OF THE INVENTION

1. Field of the Invention

The present invention relates to a structure of a covered wire for providing water cutoff to the covered wire by sandwiching the covered wire constituted by covering core lines by a water cutoff member made of a resin to subject to ultrasonic welding.

2. Related Art

Figure 12:
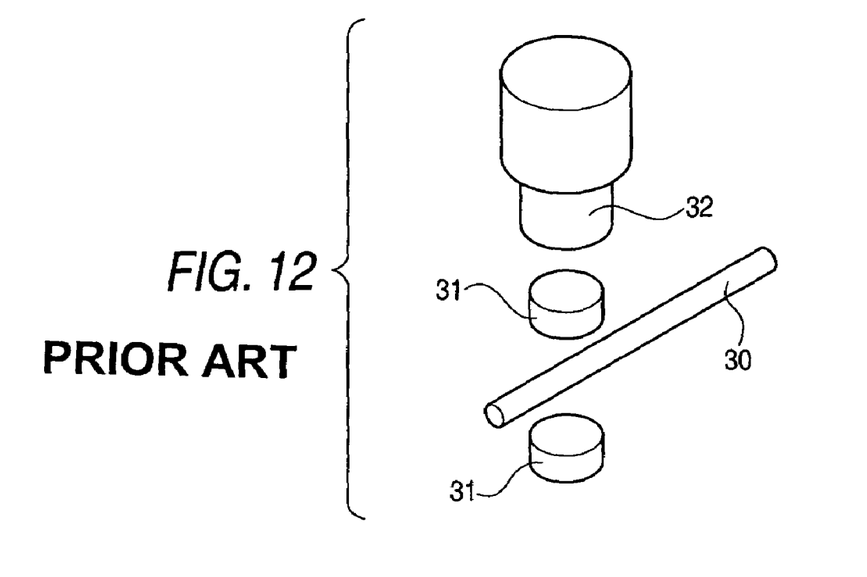
FIG. 12 is a disassembled perspective view showing a water cutoff structure of a related art.
Figure 13:
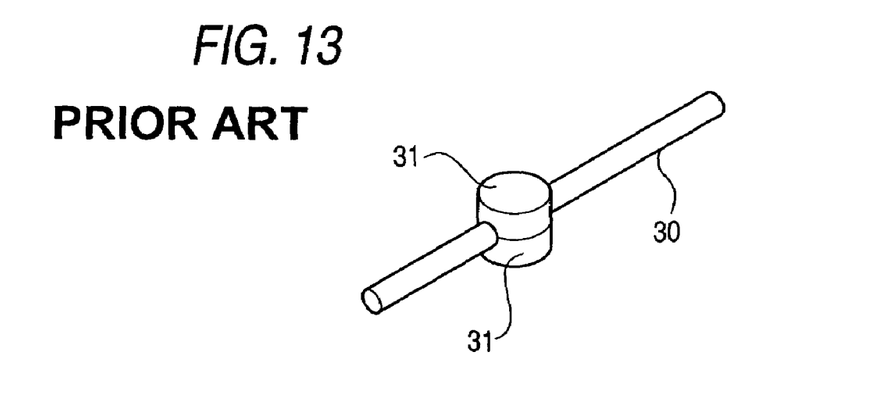
FIG. 13 is a perspective view showing a state after subjecting the water cutoff structure of FIG. 12 to ultrasonic welding.

In reference to FIG. 12 and FIG. 13, in a related art, there is a water cutoff structure of a covered wire 30 for carrying out a water cutoff processing by sandwiching the covered wire 30 by a pair of upper and lower water cutoff members 31 made of a resin in FIG. 12 and applying an ultrasonic wave from an upper side of FIG. 12 of the water cutoff member 31 by an ultrasonic welding horn 32 to thereby weld the water cutoff member 31 to core lines of the covered wire 30 (refer to Japanese Patent Publications Nos. JP-A-7-320842 and JP-A-11-250952).

Each of the water cutoff members 31 is formed to be larger than a widening width of the core lines of the covered wire 30 after ultrasonic welding. Thereby, in ultrasonic welding, the molten resin of the respective water cutoff members 31 is filled among the core lines of the covered wire 30 to ensure a water cutoff function.

According to the above-described water cutoff structure of the covered wire 30 of the related art, with an increase in a size of the covered wire 30 to be subjected to water cutoff, also a size of the water cutoff member 31 needs to increase in direct proportion thereto. Therefore, there poses a problem that downsizing thereof is difficult.

Further, when a small water cutoff member is used to achieve downsizing, there poses a problem that crack is liable to cause and a sufficient water cutoff function cannot be achieved.

Further, there poses a problem that time is taken in ultrasonic welding and an increase in cost is unavoidable.

SUMMARY OF THE INVENTION

It is an object of the invention to provide a water cutoff structure of a covered wire capable of achieving to downsize a water cutoff member, capable of firmly carrying out a water cutoff processing of a covered electric water and capable of reducing cost by shortening welding time.

A water cutoff structure of a covered wire according to the invention is characterized in that in a water cutoff structure of a covered wire for providing water cutoff to the covered wire by sandwiching the covered wire constituted by covering core lines by a pair of water cutoff members made of a resin to subject to ultrasonic welding, each of the water cutoff members is provided with a water cutoff portion welded to the core lines of the covered wire by ultrasonic welding, the cutoff portion of either one of the water cutoff members is formed in a recessed shape and the water cutoff portion of other of the water cutoff members is formed in a projected shape in correspondence with the water cutoff portion in the recessed shape.

According to the water cutoff structure of the covered wire having the above-described constitution, the covered wire to be subjected to water cutoff is sandwiched between the water cutoff portions of the respective water cutoff members under the state, the water cutoff member is subjected to excitation of ultrasonic oscillation under the state. The oscillated water cutoff member welds the water cutoff portion to the covered wire by ultrasonic welding. Thereby, the respective covered wire is subjected to the water cutoff processing.

In the ultrasonic welding, the ultrasonic welding is carried out such that the core lines of the covered wire are spread along the respective water cutoff portions in the recessed shape and in the projected shape. Therefore, the ultrasonic oscillation is easy to transmit to the covered wire, an operational time period is shortened, it is not necessary to increase a size of the water cutoff member to be large in direct proportion to a size of the covered wire and downsizing can be achieved.

Further, it is preferable that the water cutoff portion in the recessed shape is formed in a shape of a curved face along an outer shape of the covered wire and the water cutoff portion in the projected shape is formed in a shape of a curved face in correspondence with the shape of the curved face of the water cutoff portion in the recessed shape.

According to the water cutoff structure of the covered wire having the above-described constitution, in ultrasonic welding, the ultrasonic welding is carried out such that the core lines of the covered wire are spread along the water cutoff portions in the recessed shape and in the projected shape which are shapes of curved faces along an outer shape of the covered wire.

Therefore, the ultrasonic oscillation is easy to transmit to the covered wire, the operational time period is shortened, it is not necessary to increase the size of the water cutoff member in direct proportion to the size of the covered wire and downsizing can be achieved.

In the invention, the recessed face and the projected face of the water cutoff portion may formed to align in the longitudinal direction of the covered wire, the core lines of the covered wire are deformed in a recessed and projected shape in the longitudinal direction and therefore, a force of adhering the covered wire and the cutoff member is increased. Therefore, a force of fixedly attaching the electric wire is increased and the water cutoff function is further promoted.

DETAILED DESCRIPTION OF THE PREFERRED EMBODIMENTS

First Embodiment

Figure 1:
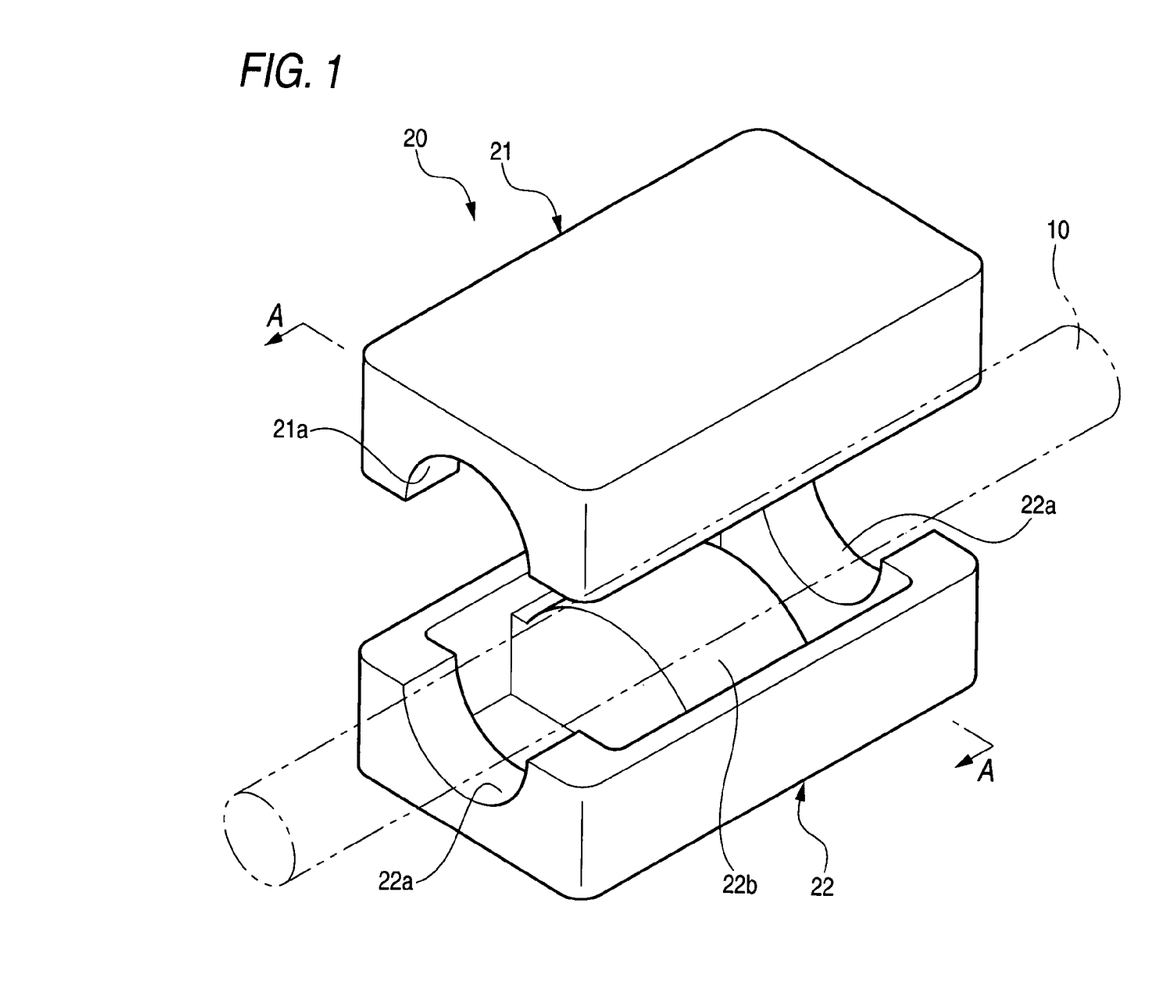
FIG. 1 is a disassembled perspective view showing a water cutoff structure of a covered wire according to a first embodiment of the invention.
Figure 2:
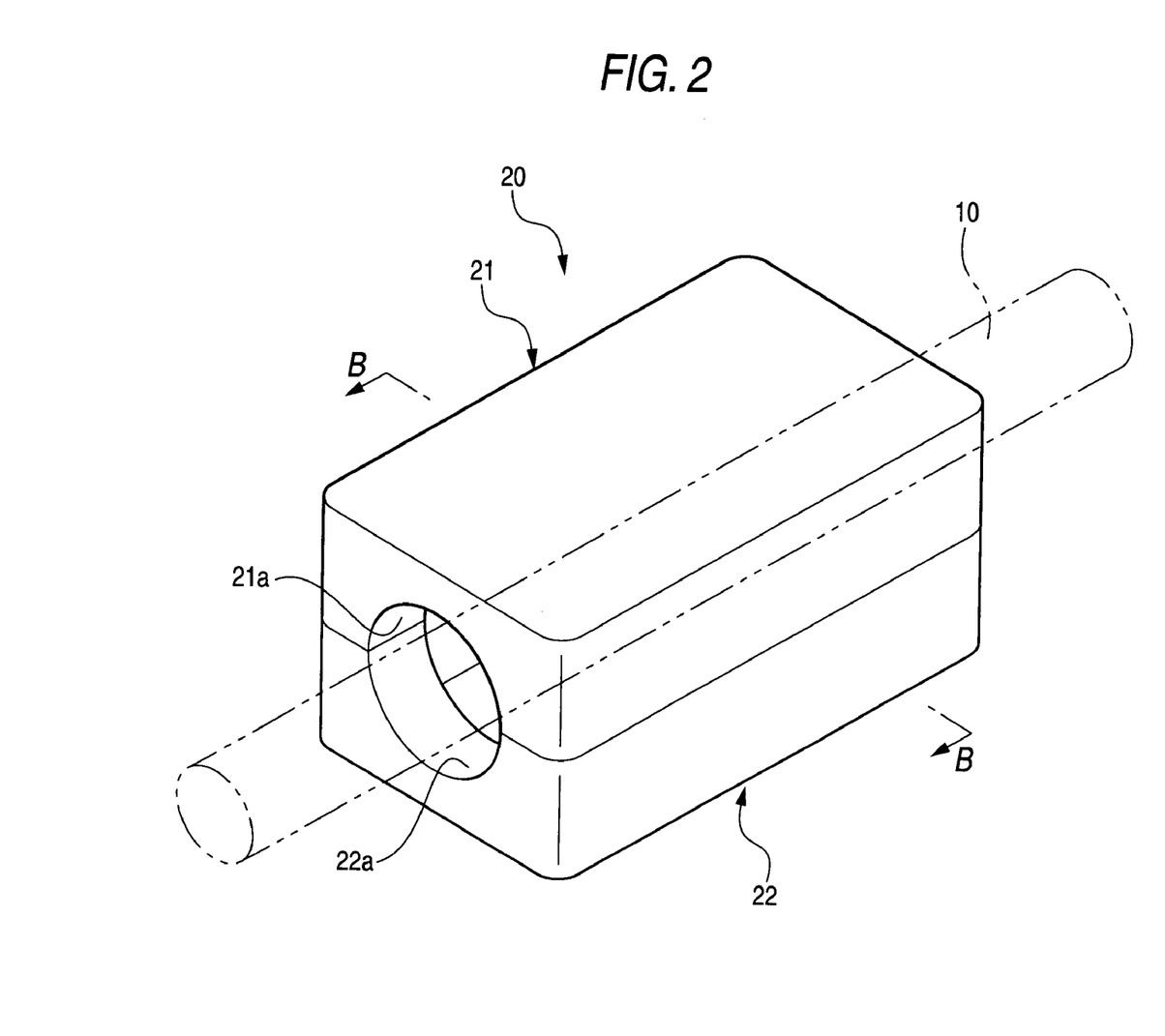
FIG. 2 is a perspective view showing a state after subjecting the water cutoff structure of FIG. 1 to ultrasonic welding.
Figure 3A:
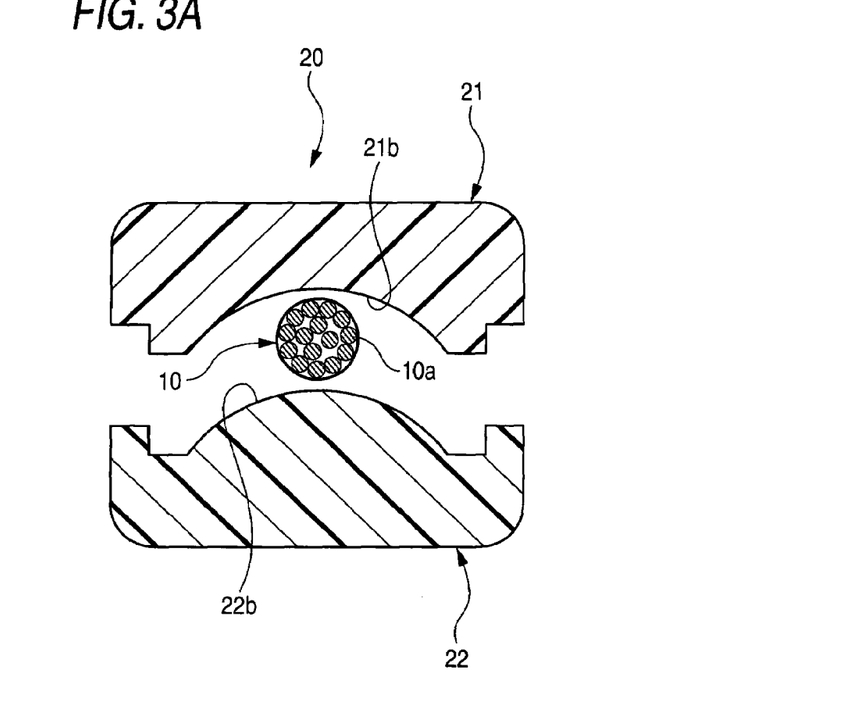
FIGS. 3A and 3B illustrate sectional views of the water cutoff structure of FIG. 1.
Figure 3B:
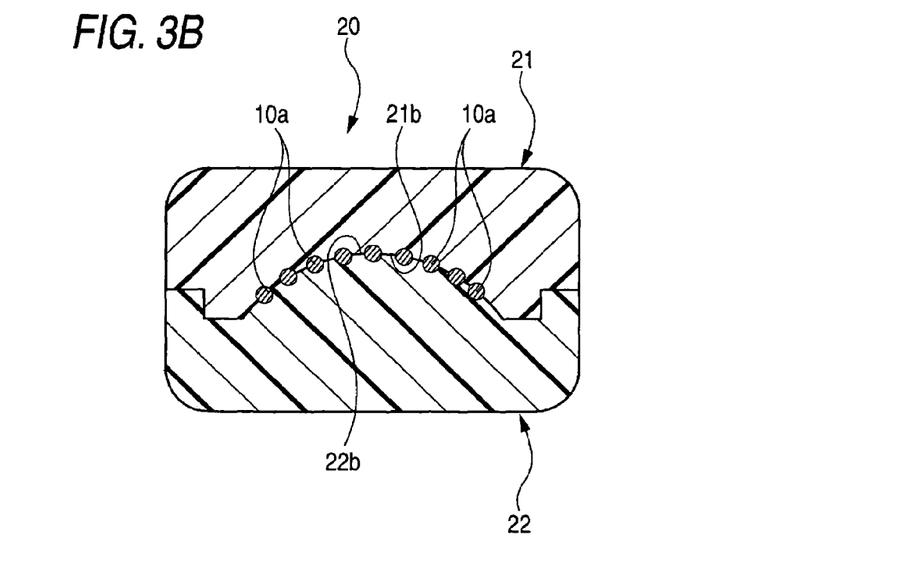
Figure 4:
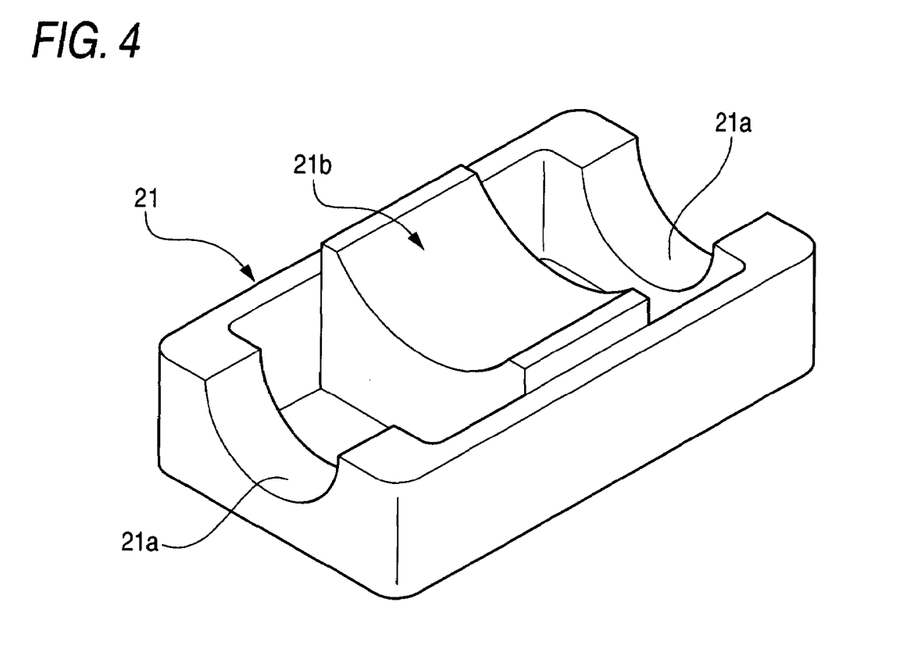
FIG. 4 is a perspective view showing an upper side member of a water cutoff member of the water cutoff structure of FIG. 1.

An explanation will be given of the first embodiment of a water cutoff structure of a covered wire according to the invention in reference to FIG. 1 through FIG. 5 as follows. FIG. 1 is a disassembled perspective view showing a water cutoff structure of a covered wire according to an embodiment of the invention and FIG. 2 is a perspective view showing a state after subjecting the water cutoff structure of FIG. 1 to ultrasonic welding. Further, FIGS. 3A and 3B illustrate sectional views of the water cutoff structure of FIG. 1: FIG. 3A is a sectional view taken along a line A—A of FIG. 1 showing a state before sandwiching the covered wire and FIG. 3B is a sectional view taken along a line B—B of FIG. 2 showing a state of subjecting the covered wire to ultrasonic welding. FIG. 4 is a perspective view showing an upper side member of a water cutoff member of the water cutoff structure of FIG. 1 and FIG. 5 is a perspective view showing a lower side member of the water cutoff member of the water cutoff structure of FIG. 1.

In reference to FIG. 1 through FIG. 5, in a water cutoff structure of a covered wire 10, water cutoff members 20 made of a resin are constituted by an upper side member 21 and a lower side member 22 and carry out a water cutoff processing to the covered wire 10 by exciting an ultrasonic wave from upper sides of FIG. 2, FIG. 3A and FIG. 3B by an ultrasonic welding horn in a state of sandwiching the covered wire 10 constituted by covering core lines 10a (FIGS. 3A and 3B) between the upper side member 21 and the lower side member 22.

Figure 5:
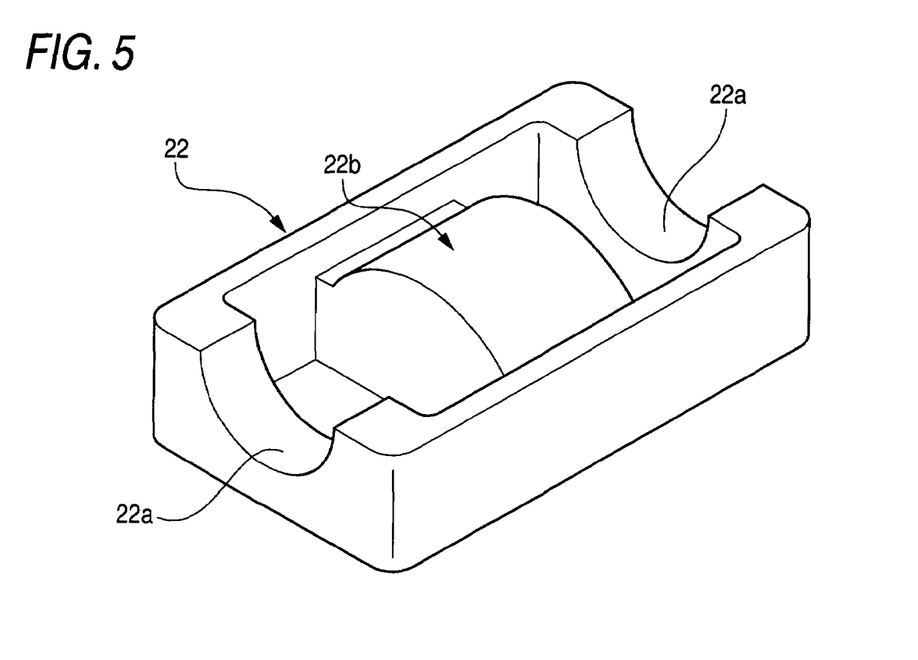
FIG. 5 is a perspective view showing a lower side member of the water cutoff member of the water cutoff structure of FIG. 1.

The upper side member 21 and the lower side member 22 of the water cutoff members 20 are respectively formed with pairs of wire guide grooves 21a and 22a for guiding the covered wire 10 at twos of left and right side faces in FIG. 4 and FIG. 5 and are provided with water cutoff portions 21b and 22b to be subjected to ultrasonic welding with the core lines 10a of the covered wire 10 substantially at centers between the respective wire guide grooves 21a and 22a.

The water cutoff portion 21b of the upper side member 21 is formed in a recessed shape which is a shape of a curved face along an outer shape of the covered wire. Further, the water cutoff portion 22b of the lower side member 22 is formed in a projected shape in correspondence with the water cutoff portion 21b in the recessed shape and the projected shape is a shape of a curved face in a projected shape in correspondence with the shape of the curved face of the water cutoff portion 21b in the recessed shape.

Operation of the embodiment will be explained.

In the water cutoff structure of the covered wire 10, the water cutoff members 20 make the covered wire 10 to be subjected to water cutoff disposed between the upper side member 21 and the lower side member 22, guides the covered wire 10 to the respective wire guide grooves 21a and 22a of the upper side member 21 and the lower side member 22 and sandwiches the covered electric 10 between the water cutoff portion 21b of the upper side member 21 and the water cutoff portion 22b of the lower side member 22 (refer to FIG. 3A).

Under the state, the water cutoff members 20 are subjected to ultrasonic oscillation by the ultrasonic welding horn from the upper side on upper faces of the upper side member 21 and the lower side member 22 in FIG. 2 and FIGS. 3A and 3B. The oscillated water cutoff members 20 melt the cover of the covered wire 10 sandwiched between the water cutoff portion 21b of the upper side member 21 and the water cutoff portion 22b of the lower side member 22 and also melts the respective water cutoff portions 21b and 22b to thereby weld the respective core lines 10a of the covered wire 10 to the respective water cutoff portions 21b and 22b (refer to FIG. 3B). Thereby, the covered wire 10 is subjected to the water cutoff processing for cutting off water invading via intervals among the core lines 10a.

In ultrasonic welding, the core lines 10a of the covered wire 10 are welded to spread along the respective water cutoff portions 21b and 22b in the recessed shape and the projected shape which are the shapes of the curved faces along the outer shape of the covered wire 10 (refer to FIG. 3B).

Therefore, the ultrasonic oscillation is easy to transmit to the covered wire 10 and an operational time period is shortened, it is not necessary to increase a dimension W in the width direction of the water cutoff members 20 in direct proportion to the size of the covered wire 10 and downsizing is achieved. In other words, the dimension W in the width direction of the upper side member 21 and the lower side member 22 can be set to be comparatively small relative to the size of the covered wire 10.

As described above, according to the embodiment, the water cutoff portion 21b of the upper side member 21 is formed in the recessed shape which is the shape of the curved face along the outer shape of the covered wire and the water cutoff portion 22b of the lower side member 22 is formed in the projected shape in correspondence with the water cutoff portion 21b in the recessed shape and the projected shape is the shape of the curved face in the projected shape in correspondence with the shape of the curved face of the water cutoff portion 21b in the recessed shape.

Therefore, even when the size of the covered wire 10 to be subjected to water cutoff is large, the water cutoff processing of the covered wire 10 can firmly be carried out while being capable of achieving downsizing and space saving formation by setting the dimension W in the width direction of the water cutoff members 20 to be comparatively small. Further, the ultrasonic oscillation is easy to transmit to the covered wire 10, shortening of a welding time period can be achieved and cost can be reduced.

Second Embodiment

Figure 6:
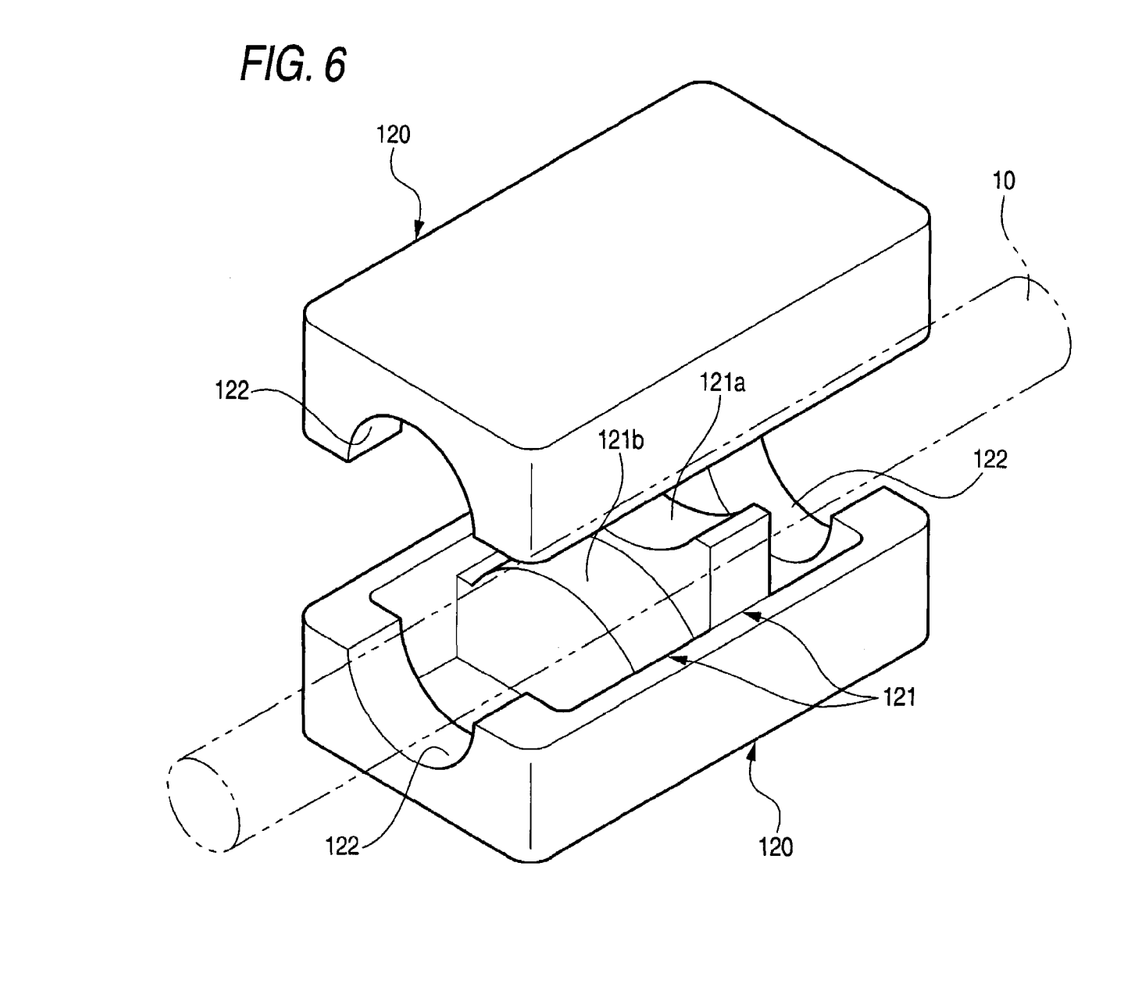
FIG. 6 is a disassembled perspective view showing a water cutoff structure of a covered wire according to a second embodiment of the invention.
Figure 7:
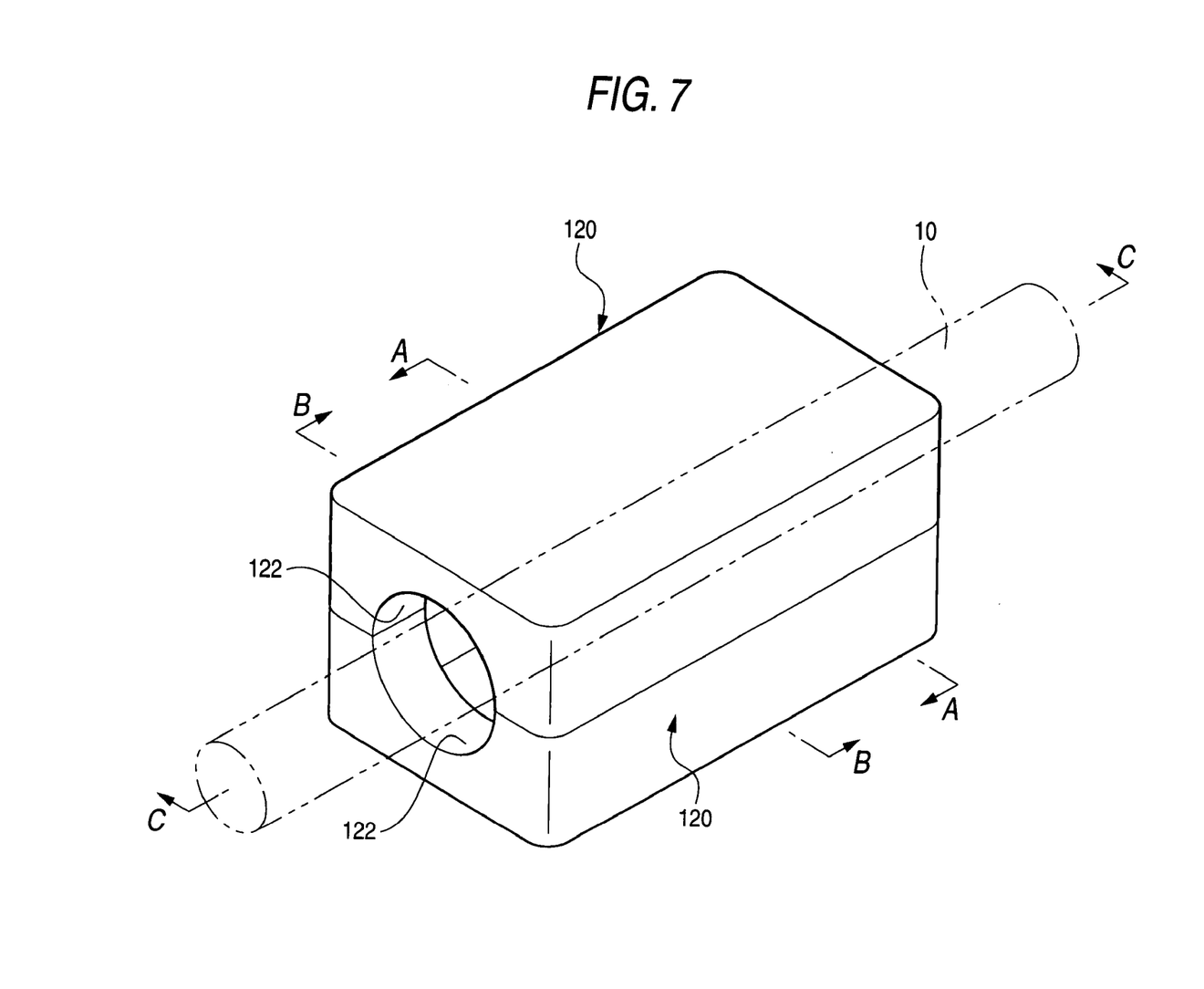
FIG. 7 is a perspective view showing a state after subjecting the water cutoff structure of FIG. 6 to ultrasonic welding.
Figure 8:
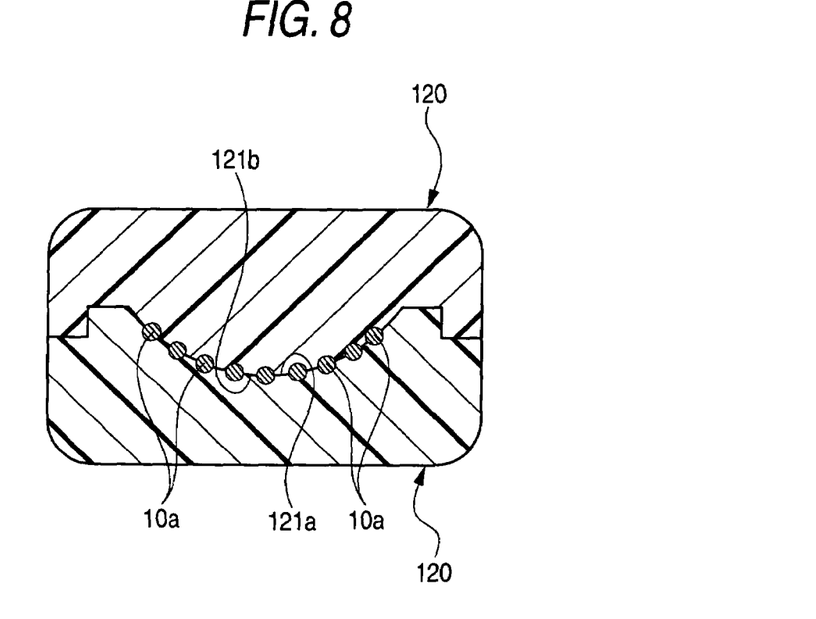
FIG. 8 is a sectional view taken along a line A—A of the water cutoff structure of FIG. 6.
Figure 9:
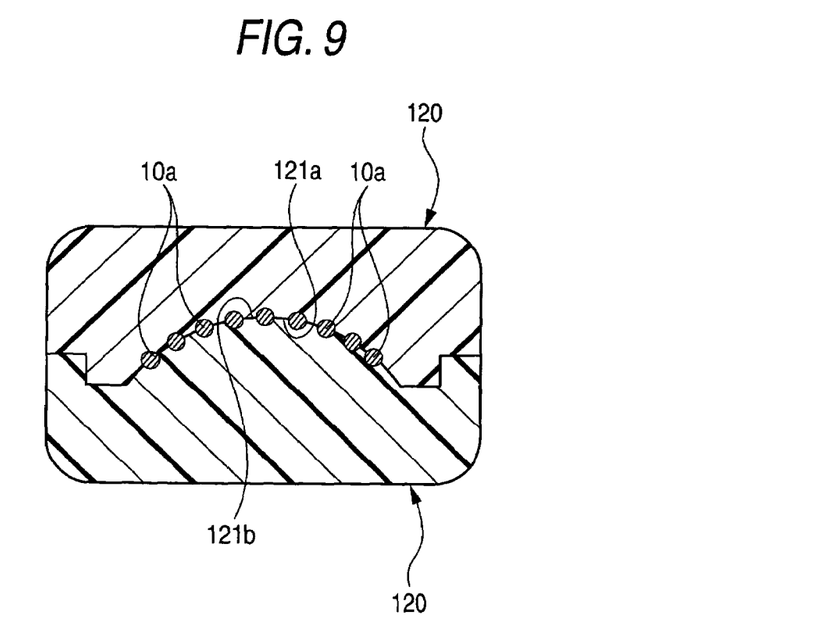
FIG. 9 is a sectional view taken along a line B—B of the water cutoff structure of FIG. 6.
Figure 10:
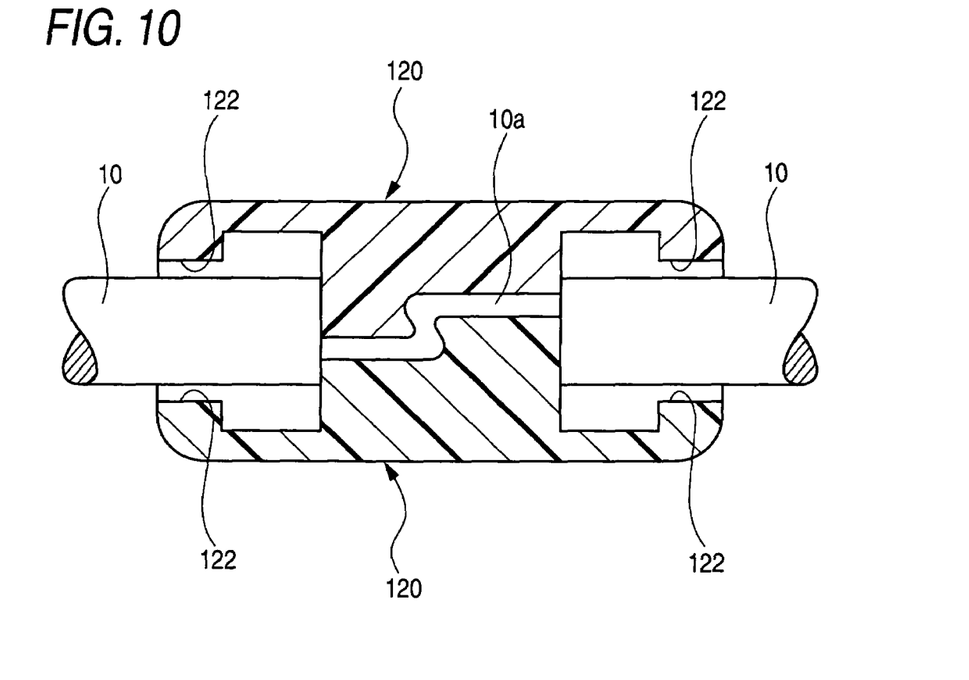
FIG. 10 is a sectional view taken along a line C—C of the water cutoff structure of FIG. 6.
Figure 11:
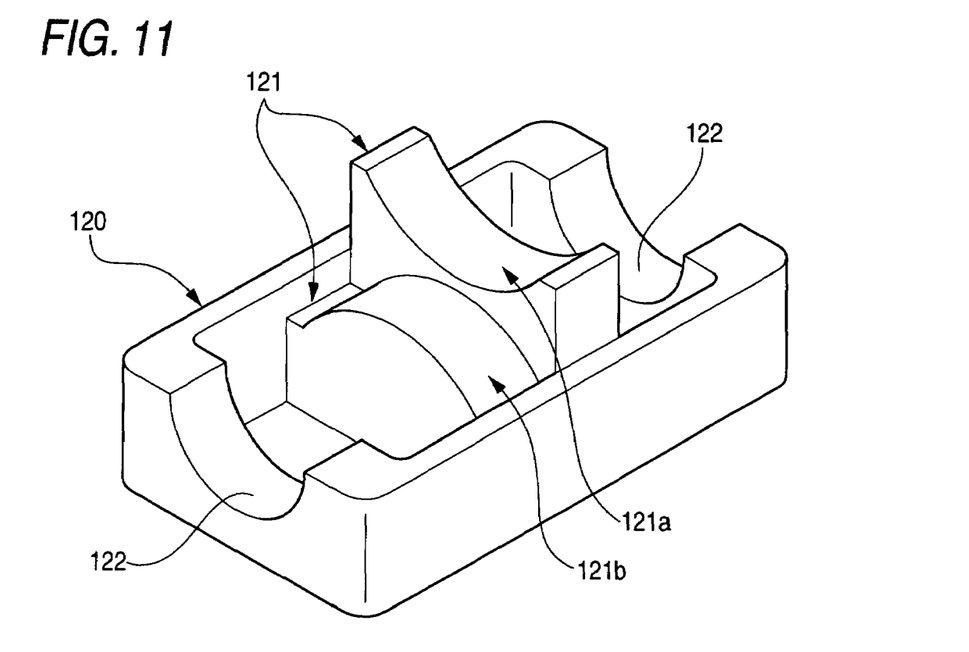
FIG. 11 is a perspective showing a water cutoff member of the water cutoff structure of FIG. 6.

An explanation will be given of a second embodiment of a water cutoff structure of a covered wire according to the invention in reference to FIG. 6 through FIG. 11 as follows. FIG. 6 is a disassembled perspective view showing a water cutoff structure of a covered wire according to an embodiment of the invention and FIG. 7 is a perspective view showing a state after subjecting the water cutoff structure of FIG. 6 to ultrasonic welding. Further, FIG. 8 illustrates sectional views of the water cutoff structure of FIG. 6, FIG. 8 is a sectional view taken along a line A—A of FIG. 6. FIG. 9 is a sectional view taken along a line B—B of FIG. 6. FIG. 10 is a sectional view taken along a line C—C of FIG. 6. FIG. 11 is a perspective view showing an upper side member of a water cutoff member of the water cutoff structure of FIG. 6 and FIG. 10 is a perspective view showing the water cutoff member of the water cutoff structure of FIG. 6.

Similarly to the first embodiment, the second embodiment, as shown in FIG. 1 through FIG. 5, provides a water cutoff structure of the covered wire 10. Water cutoff members 20 made of a resin carry out a water cutoff processing to the covered wire 10 by exciting an ultrasonic wave from upper sides of FIG. 6 by an ultrasonic welding horn in a state of sandwiching the covered wire 10 having covering core lines 10a (FIGS. 8 through 10) with the upper and lower water cutoff members 20.

On left and right sides of each water cutoff member 120, as shown in FIG. 11, a pair of wire guide grooves 121a and 122a are respectively formed for guiding the covered wire 10. A water cutoff portion 121 to be subjected to ultrasonic welding with the core lines 10a of the covered wire 10 is provided with substantially at centers between the wire guide grooves 121a and 122a.

The water cutoff portion 121 is formed by aligning a recessed face 121a and a projected face 121b in a longitudinal direction of the covered wire 10. The recessed face 121a of the water cutoff portion 121 is formed by a shape of a curved shape along an outer shape of the covered wire 10. Further, the projected face 121b of the water cutoff portion 121 is formed by a shape of a curved face in correspondence with the shape of the curved face of the recessed face 121a.

In the second embodiment, in addition to the advantages of the first embodiment, the recessed face 121a and the projected face 121b of the water cutoff portion 121 are formed to align in the longitudinal direction of the covered wire 10, the core lines 10a of the covered wire 10 are deformed in a recessed and projected shape in the longitudinal direction (refer to FIG. 10) and therefore, a force of adhering the covered wire 10 and the cutoff member 120 is increased. Therefore, a force of fixedly attaching the electric wire is increased and the water cutoff function is further promoted.

Further, it is not necessary to change the shapes of the respective water cutoff members 120 between the upper part and the lower part in FIG. 6. For example, a pair of the water cutoff members 120 having the same shape can commonly be served for mating to each other. Thus, it is not necessary to prepare many kinds of the water cutoff members 120 having different shapes, the water cutoff member 120 can be used without discriminating a shape or the like in operation and shortening of an operational time period can be achieved. Thereby, cost can be reduced.

Third Embodiment

Figure 14:
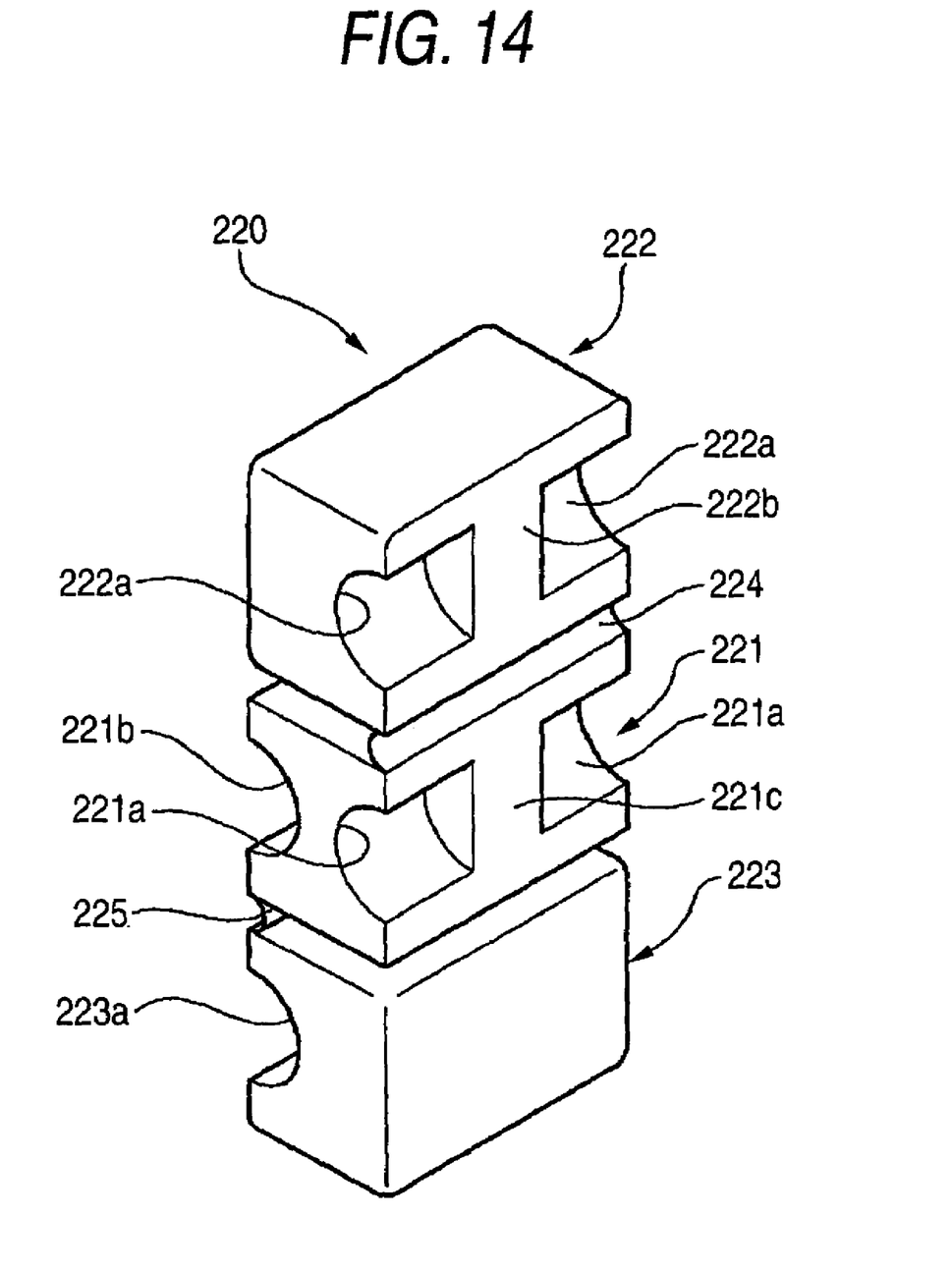
FIG. 14 is a perspective view showing a water cutoff structure of covered wires in an opening state according to a third embodiment of the invention.
Figure 15:
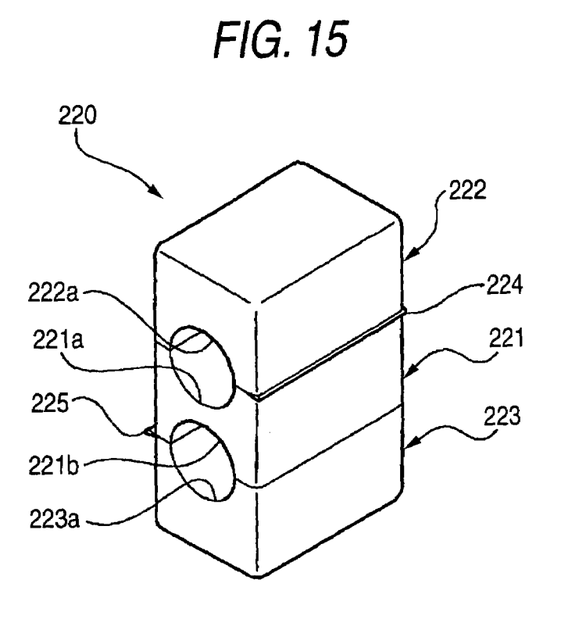
FIG. 15 is a perspective view showing the water cutoff structure of FIG. 14 in a closed state.
Figure 16:
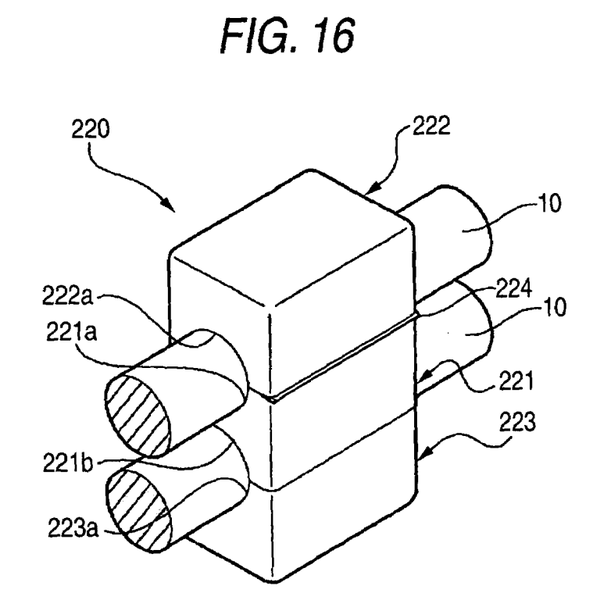
FIG. 16 is a perspective view showing the water cutoff structure of FIG. 14 in the closed state in which the covered wires are held.

An explanation will be given of a third embodiment of a water cutoff structure of covered wires according to the invention in reference to FIG. 14 through FIG. 16 as follows. FIG. 14 is a perspective view showing the water cutoff structure in an opening state according to a third embodiment of the invention. FIG. 15 is a perspective view showing the water cutoff structure of FIG. 14 in a closed state. FIG. 16 is a perspective view showing the water cutoff structure of FIG. 14 in the closed state in which the covered wires are held.

In a water cutoff structure of this embodiment, as shown in FIG. 14 though FIG. 16, water cutoff members 220 are constituted by a first member 221, second member 222 and third member 223 and carry out a water cutoff to two covered wires 10 by exciting an ultrasonic welding horn in a vertical direction of FIGS. 15 and 16, in a state of sandwiching the covered wires 10 including core lines with wire welding grooves 221a, 221b, 222a and 223a of the first through third member 221, 222, 223, respectively.

The second member 222 is integrally connected to a side surface of the first member 221 (located on front side of the sheet in FIG. 14) with a hinge 224 so as be swingable to the first member 221. The second member 222 has the wire welding groove 222a and a water cutoff portion 222b on a mating side surface of the second member 222 which opposes to the side face of the first member 221 when the second member 222 is swung so as to mate to the first member 221. The wire welding groove 222a and the water cutoff portion 222b have the identical shapes to a wire welding groove 221a and a water cutoff portion 221c of the first member 221, respectively.

Similarly, the third member 223 is integrally connected to another side surface of the first member 221 (located on rear side of the sheet in FIG. 14) with a hinge 225 so as be swingable to the first member 221. The third member 223 has the wire welding groove 223a and a water cutoff portion (not shown) on a mating side surface of the third member 223 which opposes to the another surface of the first member 221 when the third member 223 is swung so as to mate to the first member 221. The wire welding groove 223a and the water cutoff portion have the identical shapes to a wire welding groove 221b and a water cutoff portion (not shown) of the first member 221, respectively.

Incidentally, although the water cutoff portions 221c, 222b etc. are illustrated with flat faces in this embodiment, these portions can be configured to be curved as described in the first and second embodiment.

In the water cutoff structure of the invention, two of the covered wires 10 are received at the wire welding grooves 221a and 221b of the first member 221. Then the second member 222 and the third member 223 are swung so as to mate to the first member 221 around the hinges 224, 225 respectively. The wires 10 are held between the wire welding grooves 221a, 221b of the first member 221 and the wire welding grooves 222a, 223a of the second and third members 222, 223, respectively. In this state, the ultrasonic welding is conducted in a similar manner as described in the first and second embodiments, by exciting an ultrasonic welding horn in a vertical direction of FIGS. 15 and 16.

In the above water cutoff structure, the water cutoff process can be performed to two covered wires 10 at the same time. That is, the water cutoff portions of the first, second and third members 221, 222, 223 are aligned in a state holding the covered wires 10. The covered wires 10 are attached at the same time in one ultrasonic operation with a single pair of the horns. Therefore, the number of parts for the water cutoff members 220 as well as the number of steps required for carrying out an ultrasonic welding can be reduced. As a result, costs for water cutoff process for the covered wires 10 can be reduced.

As has been explained, according to the water cutoff structure of the covered wire of the invention, each of the water cutoff members is provided with the water cutoff portion to be welded to the core lines of the covered wire by ultrasonic welding, the water cutoff portion of either one of the water cutoff members is formed in a recessed shape and the water cutoff portion of other of the water cutoff members is formed in the projected shape in correspondence with the water cutoff portion in the recessed shape.

Therefore, downsizing of the water cutoff member can be achieved, the water cutoff processing of the covered wire can firmly be carried out and cost can be reduced by achieving to shorten a welding time period.

According to the water cutoff structure of a covered wire of the invention, the water cutoff portion in the recessed shape is formed by the shape of the curved face along the outer shape of the covered wire and the water cutoff portion in the recessed shape is formed in the shape of the curved face in correspondence with the shape of the curved face of the water cutoff portion in the recessed shape.

Therefore, downsizing of the water cutoff member can be achieved, the water cutoff processing of the covered wire can firmly be carried out and cost can be reduced by achieving to shorten the welding time period.

What is claimed is:

1. A water cutoff structure of a covered wire, in which first and second members made of a resin are attached on the covered wire by ultrasonic welding to thereby provide water cutoff, comprising:

the first and second members including a first water cutoff portion and a second water cutoff portion respectively, each of which is welded to core lines provided in the covered wire by ultrasonic welding;

at least a part of the first water cutoff portion of the first member being formed in a recessed shape; and at least a part of the second water cutoff portion of the second member being formed in a projected shape in correspondence with the shape of the first water cutoff portion;

wherein said core lines are spread along the respective water cutoff portions in the recessed shape and the projected shape.

2. The water cutoff structure according to claim 1, wherein the first water cutoff portion includes a first curved face along an outer shape of the covered wire and the second water cutoff portion includes a second curved face in correspondence with the first curved face of the first water cutoff portion.

3. The water cutoff structure according to claim 1, wherein each of the first and second water cutoff portions includes a recessed face and a projected face which are aligned in a longitudinal direction of the covered wire.

4. The water cutoff structure according to claim 3, wherein the recessed face of the first water cutoff portion is formed in a shape of a first curved face along an outer shape of the covered wire and the projected face of the second cutoff portion is formed in a shape of a second curved face in correspondence with the first curved face of the first water cutoff portion.

5. The water cutoff structure according to claim 3, wherein the first and second water cutoff portions haves substantially identical shape.

6. The water cutoff structure according to claim 1, wherein the first and second water cutoff members are connected to each other with a hinge.

7. The water cutoff structure according to claim 1, further comprising a third member including a third water cutoff portion which is welded to core lines provided in the covered wire by ultrasonic welding, wherein the first cutoff member includes the first water cutoff portion on an opposite side surface so that the first member and the third member are attached to another covered wire by ultrasonic welding.

8. The water cutoff structure according to claim 7, wherein the opposite first water cutoff portion, the second water cutoff portion and the third water cutoff portion are aligned so that the covered wires are attached at the same time in one ultrasonic process.

9. A water cutoff structure of a covered wire, in which a first and second members made of a resin are attached on the covered wire by ultrasonic welding to thereby provide water cutoff, comprising:

the first and second members including a first water cutoff portion and a second water cutoff portion respectively, each of which is welded to core lines provided in the covered wire by ultrasonic welding;

at least a part of the first water cutoff portion of the first member being formed in a recessed shape; and at least a part of the second water cutoff portion of the second member being formed in a projected shape in correspondence with the shape of the first water cutoff portion;

wherein the first water cutoff portion includes a first curved face along an outer shape of the covered wire and the second water cutoff portions includes a second curved face in correspondence with the first curved face of the first water cutoff portion.

10. A water cutoff structure of a covered wire, in which a first and second members made of a resin are attached on the covered wire by ultrasonic welding to thereby provide water cutoff, comprising:

the first and second members including a first water cutoff portion and a second water cutoff portion respectively, each of which is welded to core lines provided in the covered wire by ultrasonic welding;

at least a part of the first water cutoff portion of the first member being formed in a recessed shape; and at least a part of the second water cutoff portion of the second member being formed in a projected shape in correspondence with the shape of the first water cutoff portion;

wherein each of the first and second water cutoff portions includes a recessed face and a projected face which are aligned in a longitudinal direction of the covered wire.

* * * * *